(12) United States Patent
Knoble et al.

(10) Patent No.: US 7,172,323 B1
(45) Date of Patent: Feb. 6, 2007

(54) LIGHT EMITTING DIODE LIGHT SPREADER

(75) Inventors: David W. Knoble, Tupelo, MS (US); Kenneth B. Sales, Lawrenceville, GA (US)

(73) Assignee: Genlyte Thomas Group LLC, Louisville, KY (US)

( * ) Notice: Subject to any disclaimer, the term of this patent is extended or adjusted under 35 U.S.C. 154(b) by 168 days.

(21) Appl. No.: 10/820,950

(22) Filed: Apr. 8, 2004

(51) Int. Cl.
*F21V 7/04* (2006.01)
*F21V 8/00* (2006.01)

(52) U.S. Cl. ............. 362/555; 362/610; 362/620; 362/628

(58) Field of Classification Search .......... 362/551, 362/553–556, 582, 317, 615–629, 511, 26, 362/27, 558–561, 576–579, 610; 40/546, 40/547; 385/146, 901, 129, 34, 31, 36; 359/708–710
See application file for complete search history.

(56) References Cited

U.S. PATENT DOCUMENTS

| | | | |
|---|---|---|---|
| 4,389,085 A | 6/1983 | Mori | |
| 4,417,824 A | 11/1983 | Paterson et al. | |
| 4,682,844 A | 7/1987 | Mori | |
| 5,005,931 A | 4/1991 | Mori | |
| 5,233,679 A | 8/1993 | Oyama | |
| 5,542,017 A | 7/1996 | Koike | |
| 5,772,304 A * | 6/1998 | Smith | 362/511 |
| 5,881,201 A | 3/1999 | Khanarian | |
| 6,461,007 B1 | 10/2002 | Akaoka | |
| 6,471,379 B2 * | 10/2002 | Bucher et al. | 362/511 |
| 6,513,950 B1 | 2/2003 | Ono | |
| 6,520,655 B2 | 2/2003 | Ohuchi | |
| 6,554,463 B2 * | 4/2003 | Hooker et al. | 362/555 |
| 6,612,730 B1 * | 9/2003 | Ikeda | 362/558 |
| 6,637,924 B2 * | 10/2003 | Pelka et al. | 362/555 |
| 6,712,492 B2 * | 3/2004 | Shimura et al. | 362/551 |
| 6,966,685 B2 * | 11/2005 | Li et al. | 362/616 |
| 2002/0080615 A1 | 6/2002 | Marshall et al. | |
| 2002/0149949 A1 | 10/2002 | Hsieh et al. | |
| 2002/0159741 A1 | 10/2002 | Graves et al. | |
| 2002/0163810 A1 | 11/2002 | West et al. | |
| 2003/0002272 A1 | 1/2003 | Suehiro et al. | |
| 2003/0235046 A1 * | 12/2003 | Chinniah et al. | 362/511 |

* cited by examiner

*Primary Examiner*—Sandra O'Shea
*Assistant Examiner*—Bao Q. Truong
(74) *Attorney, Agent, or Firm*—Steve A. Witters; Middleton Reutlinger

(57) ABSTRACT

In order to spread the light being emitted from an LED, an LED light spreader has a light conductive end, an optical path conversion side, and a light transmitting side. The present invention enables a single LED to simulate the effect of having several discrete LEDs on a circuit board or may be configured to give the effect of having a single elongated light source.

21 Claims, 5 Drawing Sheets

LIGHT EMITTING DIODE LIGHT SPREADER

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

This invention relates to the lighting arts and, more particularly, to an LED module that spreads the light being emitted from the LED into separate and distinct length(s) of emittance.

BRIEF SUMMARY OF THE INVENTION

LED strips for illuminating signs (i.e., emergency and exit signs) are typically composed of a long circuit board having several LEDs, typically 6–15, installed perpendicular to the board. These LEDs illuminate the interior portion of the sign. Such internal illumination produces a luminance on the diffuser which produces letters, symbols, chevrons or a variety of insignia. Among the problems associated with the prior art includes low luminosity of the LEDs, installation, maintenance, and changing of a plurality of LEDs.

This invention is a transparent or translucent light spreader, enabling a single, higher powered LED light source to spread its light throughout the length of the light spreader. A typical application of the instant invention is to light the interior portion of a sign, such as an emergency or exit sign.

The LED light spreader of the present invention is generally an elongated light transmissible member having a side with prisms that redirects the light to a light transmissible side. The light spreader can have a variety of configurations such as being a hexahedron having a side with prisms formed therein which redirects the light out of a light transmissible side. There are a multitude of configurations that the light spreader of the present invention may have. Another embodiment of the present invention is an elongated light transmissible member having a rounded side with prisms formed therein and having a planar light transmissible side.

The embodiment having a rounded side and a planar side is better characterized as an elongated light transmissible member having partial cylindrical lengths interposed with partial frustoconical lengths forming a rounded and a flat side. The light spreader may have few or many lengths throughout the elongated member. For instance, the light spreader of the instant invention may be composed of a single partial frustoconical length having a flat light emitting surface. Such a configuration spreads the light evenly over a shorter distance. Conversely, the light spreader may be comprised of long partial cylindrical lengths interposed with shorter partial frustoconical lengths thus spreading the light out over a longer length. Alternately, the light spreader may have many lengths which spreads the light evenly out over a longer elongated member. Additionally, the partial cylindrical and partial frustoconical lengths may be of varying lengths thus creating portions of varying light intensity throughout the length of the planar light transmissible side of the LED light spreader.

The light spreader set forth in detail herein is comprised of a series of sections, wherein each section has a partial cylindrical length and a length having a curved prism or partial frustoconical length, both forming an elongated member having a light emitting or transmissible side and a rounded surface or optical path conversion side. Light is transmitted into the larger partial cylindrical length end, transmitted by the partial cylindrical lengths, and deflected by the partial frustoconical lengths to the light emitting side where the light is emitted from the light spreader. For example, in an embodiment having a flat or planar light emitting surface, light is emitted up to about 180° around the center of the flat side of the light spreader.

The instant invention enables a single LED to simulate the effect of having several discrete LEDs on a circuit board. Many sections may be configured into the light spreader to spread the light more evenly, thus giving the effect of having a single elongated light source.

Alternative embodiments of the instant invention include having a lens molded into the light emitting surface. This lens may also be attached to the light emitting surface to shape the light being emitted from the light spreader. For instance, the lens may be configured as being convex, concave, or irregular in shape thus directing the light to a desired location.

DESCRIPTION OF DRAWINGS

The subject matter of the invention is particularly pointed out and distinctly claimed in the concluding portion of the specification. The invention, however, both as to organization and method of operation, may best be understood by reference to the following description taken in conjunction with the subjected claims and the accompanying drawings of which:

DETAILED DESCRIPTION OF THE PREFERRED EMBODIMENTS

Figure 1:
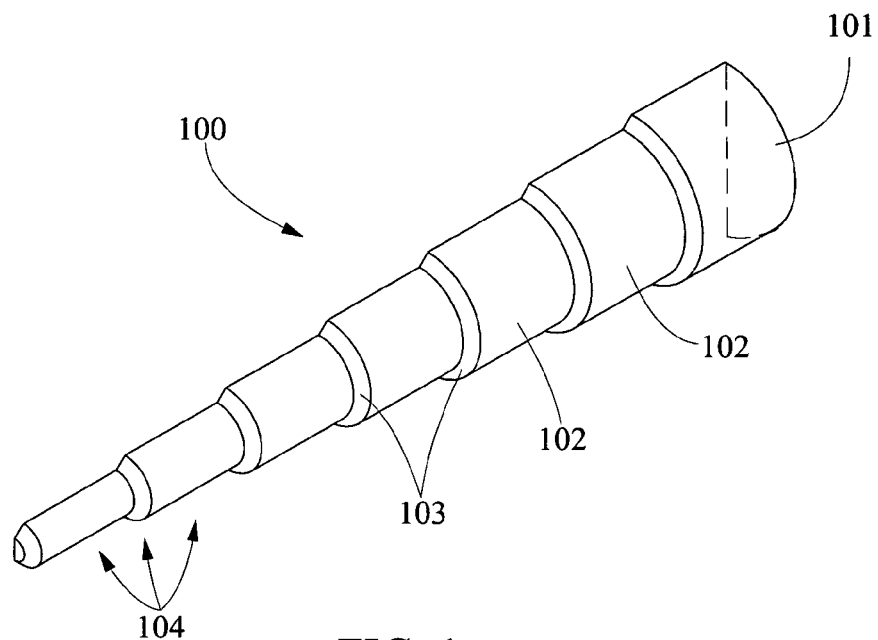
FIG. 1 is a perspective view of an embodiment of the LED light spreader of the present invention depicting sections having partial frustoconical and partial cylindrical lengths.
Figure 2:
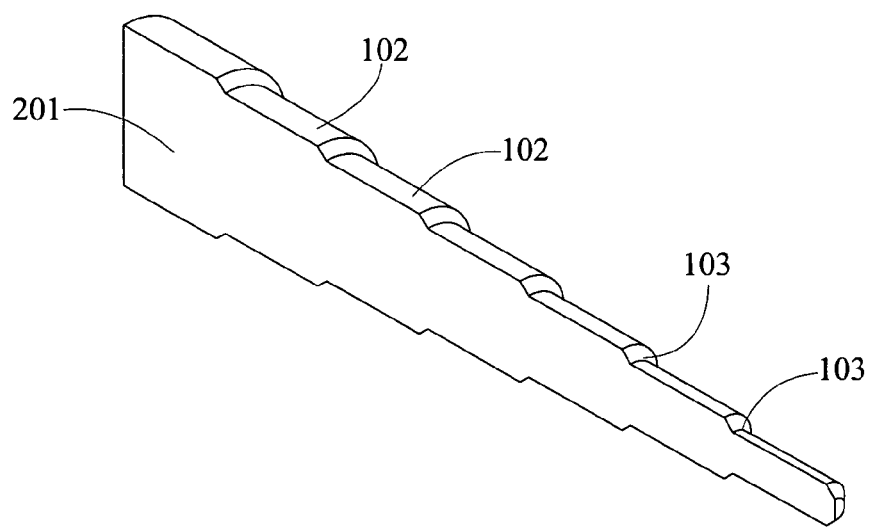
FIG. 2 is a perspective view of an embodiment of the present invention showing the light emitting surface being planar and its relationship with a rounded prismatic surface.

The light spreader 100 of the instant invention is best described with reference to the figures. FIG. 1 is a perspective view of the light spreader or elongated member 100 depicting the partial frustoconical or prismatic lengths 103 being interposed between the partial cylindrical lengths 102. These combined sections form an optical path conversion side or rounded side 104, which is shown in FIG. 1, having a light emitting surface 201 (FIG. 2). Each partial cylindrical length 102 has a surface that remains about equidistant from the light emitting surface 201 through its length. The light gathering end 101 is also depicted in the figure. The light spreader is comprised of a transparent or translucent light conductive material, preferably glass or plastic. Additionally, the exterior surface of the rounded side 104 of the light spreader 100 may be coated with a reflective material which serves to increase the efficiency of the light spreader 100. Placing a reflective material on the exterior surface of the rounded or optical path convergence side 104 improves the efficiency of the light spreader by reducing the loss of light that may occur through optical path conversion side 104.

FIG. 2 is a perspective view showing the light emitting side 201, which is shown as flat or planar in this embodiment. Light enters the light spreader at the larger or light gathering end 101, which may be flat, concave, or other shape, and travels through a plurality of partial cylindrical lengths 102. The light passing through the partial cylindrical lengths 102 encounters the partial frustoconical lengths 103, each of which acts as a prism, the light then being reflected toward the light emitting surface 201. This reflected light then exits the LED light spreader 100 through the light emitting surface 201.

Figure 3:
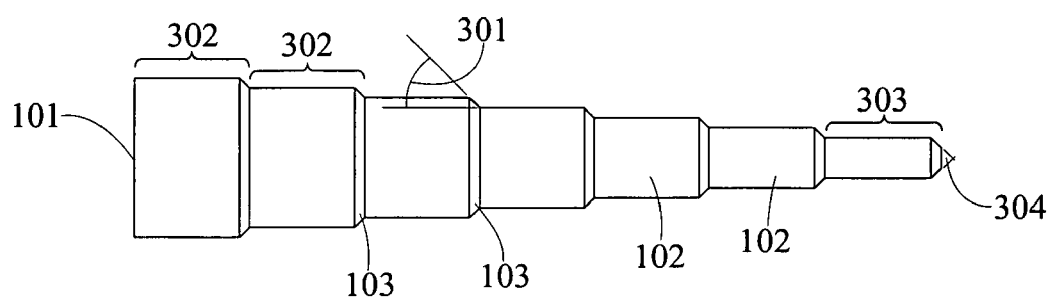
FIG. 3 is a top view of FIG. 1 showing the relationship between the partial frustoconical lengths and partial cylindrical lengths of each section on the rounded surface.

FIG. 3 is a top view of the LED light spreader 100 comprising a light gathering end 101 and a series of sections 302. Each section is comprised of partial cylindrical length 102 and an adjoining partial frustoconical length 103. This series of sections forms an elongated member having a decreasing width as the light spreader extends from light gathering end 101. The incident angle 301 of the light on the optical path convergence side 104, where a partial frustoconical length 103 joins a partial cylindrical length 102, is depicted and is about 45°. However, varying angles may be utilized for different objectives. For example, light may be focused on one side of the light spreader 100 by increasing the angle from the light entrance end 101 to the opposite distal end. Alternatively, light may be focused toward the other end of the light spreader 100 by decreasing the angle from the light entrance end 101 to the opposite distal end.

An alternative embodiment is depicted in FIG. 3 wherein the final section 303 or final partial frustoconical length having a linearly decreasing arc radius forms a point 304. The point 304 in this embodiment reflects the remaining conducted light out of light emitting surface 201. Having a final section of a frustoconical length having a point 304 rather than having a flat end opposite the light gathering end 101 keeps the light from exiting the light spreader from this end rather than from light emitting side 201. This point 304 serves to increase the percentage of light exiting from the light spreader at light emitting surface 201. Additionally, the final section 303 may end with a flat surface as depicted in FIG. 1 and this surface may be coated with a reflective material to increase the efficiency of the LED light spreader 200.

Figure 4:
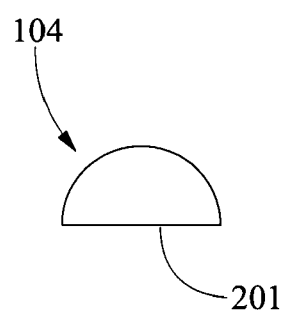
FIG. 4 provides a latitudinal cross-sectional view showing the partial circular configuration of an embodiment of the LED light spreader of the present invention.

FIG. 4 is a latitudinal cross-sectional view of an embodiment of the LED light spreader showing it having a partial circular configuration. The light spreader 100 may have a light emitting side 201 and a rounded or optical path convergence side 104.

Figure 5:
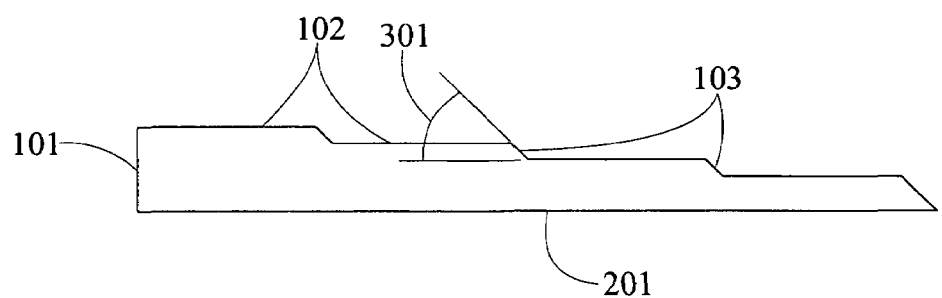
FIG. 5 provides a longitudinal cross-sectional view of the present invention showing the relationship between the light emitting side and the optical path conversion or rounded side.

FIG. 5 provides a longitudinal cross-sectional view of another embodiment of the present invention. This view comprises a light emitting side 201 and an opposite side having a series of lines 102 parallel to a linear light emitting side 201. This series of parallel lines is interposed with reflectors or partial frustoconical lengths 103 which are depicted as lines 103 being angled toward the linear side 201 at approximately 45°.

Figure 6:
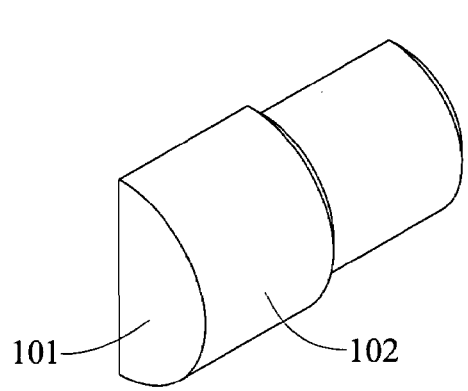
FIG. 6 is a perspective view of an embodiment of the present invention wherein the light gathering end has a planar surface.
Figure 7:
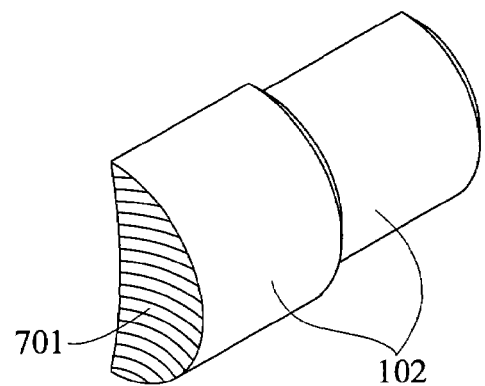
FIG. 7 is a perspective view of an embodiment of the present invention showing the light gathering end having a concave surface.

FIG. 6 is a perspective view of an embodiment of the light gathering end 101 having a planar surface. FIG. 7 is a perspective view of an alternative embodiment of the light gathering end having a concave surface 701. Additionally, the position of the LED in relationship to the light gathering surface 101 can vary with varying applications of the instant invention. Since the most efficient shape of the light gathering surface 101 is dependant on its proximity to the LED, this light gathering end 101 may be of many different configurations.

Figure 8:
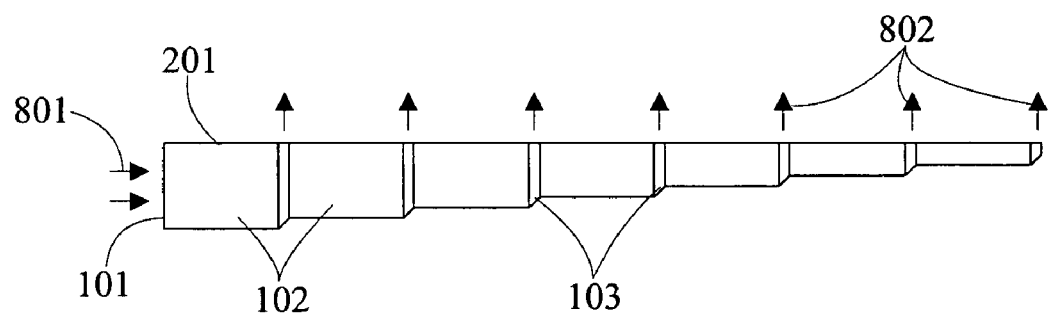
FIG. 8 is a side view of FIG. 1 showing an exemplary light gathering and light emitting pattern.

FIG. 8 is a side view showing the light gathering and emitting patterns of an embodiment of the present invention. Shown here is a series of partial cylindrical lengths 102 interposed with partial frustoconical lengths 103 in relation to a planar light emitting side 201. The light ray 801 enters the LED light spreader at light gathering end 101 and is then conducted by partial cylindrical length 102 and reflected by the prisms formed by partial frustoconical lengths 103. The light then exits light emitting surface 201 opposite each frustoconical section 103 as shown in light dispersion rays 802.

Figure 9:
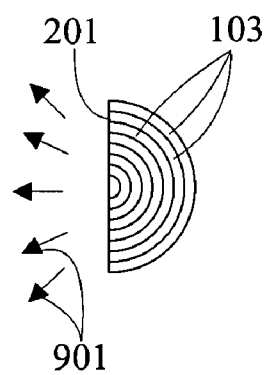
FIG. 9 provides an end view of an embodiment of the LED light spreader of FIG. 1 showing an exemplary light emitting pattern.

FIG. 9 provides an end view of an embodiment of the LED light spreader showing a light emitting pattern. This end view of the light spreader shows each prism or partial frustoconical length 103. As can be seen in this figure, an embodiment having a planar or flat light emitting surface 201 causes the light to exit the light spreader from the light emitting surface 201 at approximately 180° around a central axis.

Figure 10:
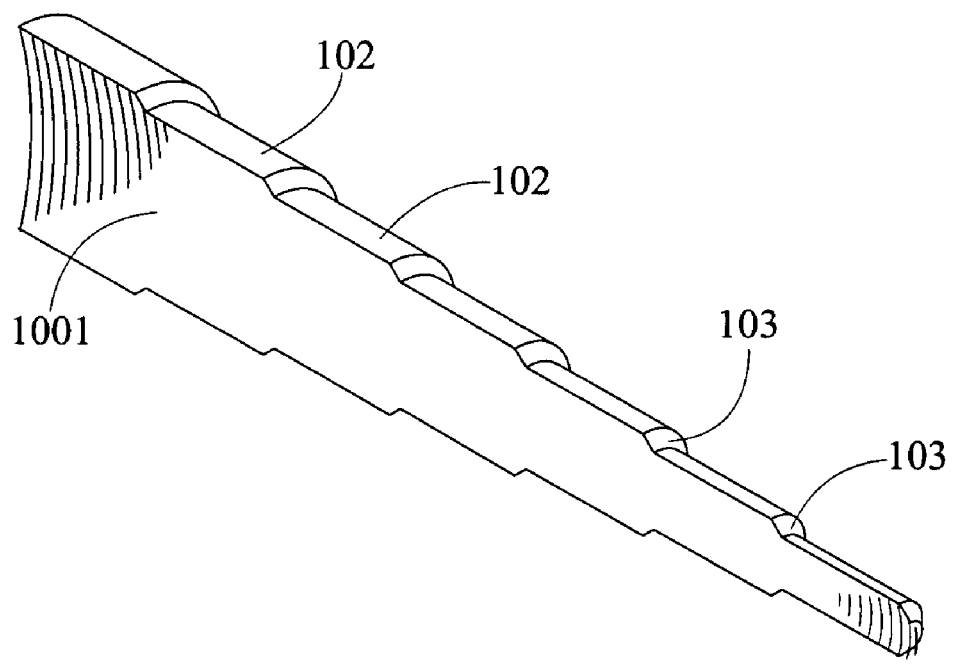
FIG. 10 provides a perspective view of an alternative embodiment of the LED light spreader of the present invention having a concave lens within the light emitting surface.

FIG. 10 provides a perspective view of an alternative embodiment of the LED light spreader having a concave lens 1001 within the light emitting surface 201. It is contemplated that the light emitting surface 201 may be convex or irregular in shape. This may be accomplished by shaping the light emitting surface 201 or by affixing a lens onto the light emitting surface. The desired light emittance pattern dictates the shape of the lens within or on the light emitting surface 201 and the figures shall not be construed to limit these alternative embodiments.

Other embodiments of the present invention include varying the axial length of the partial frustoconical portion 103 and partial cylindrical portion 102. For instance, the light spreader of the instant invention may be composed of a single partial frustoconical length 103 and light emitting surface 201. Such a configuration spreads the light evenly over a shorter distance. Conversely, the light spreader may be comprised of long cylindrical lengths 102 and shorter partial frustoconical lengths 103 thus spreading the light over a longer length. In another embodiment, the light spreader may have many sections 302, which spreads the light out over a longer elongated member or light spreader 100. Additionally, the partial cylindrical 102 and partial frustoconical lengths 103 may be of varying lengths which create portions of varying light intensity throughout the length of the LED light spreader 100.

The present invention of a transparent or translucent LED light spreader enables a single LED to spread its light throughout the length of the light spreader. The LED light spreader of the present invention is an elongated light transmissible member having a side with prisms that redirects the light to a light transmissible or light emitting side.

We claim:

1. A light emitting diode light spreader comprising a series of partial cylindrical lengths interposed with partial frustoconical lengths forming an elongated member having a rounded surface and a light emitting surface, said light emitting surface being substantially smooth.

2. The light emitting diode light spreader of claim 1 wherein said elongated member is comprised of a transparent material.

3. The light emitting diode light spreader of claim 1 wherein said rounded surface is coated with a reflective material.

4. The light emitting diode light spreader of claim 1 wherein said elongated member further comprises a semicircular light gathering end.

5. The light emitting diode light spreader of claim 1 wherein said light emitting surface is planar.

6. The light emitting diode light spreader of claim 1 wherein said light emitting surface is curved inward.

7. An elongated light emitting diode light spreader formed of a light-transmissible material comprising a light conductive end, an optical path conversion side, and a planar light transmitting side; wherein said optical path conversion side is substantially rounded about a longitudinal axis of said elongated light emitting diode light spreader and has a plurality of light transmissible lengths being interposed with prismatic lengths.

8. The light emitting diode light spreader of claim 7 wherein said light spreader is comprised of a plastic translucent material.

9. The light emitting diode light spreader of claim 7 wherein said optical path conversion side is coated with a reflective material.

10. The light emitting diode light spreader of claim 7 wherein said light conductive end is planar.

11. The light emitting diode light spreader of claim 7 wherein said light conductive end is curved inward.

12. An elongated transparent member comprised of a flat side and a rounded side, wherein said rounded side has a series of sections, said sections having a first length of a constant arc radius and a second length of linearly decreasing arc radius about said flat side.

13. The transparent member in claim 12 wherein said series of sections has a final section, wherein said length of constant arc radius of said final section ends with a planar surface.

14. The transparent member in claim 12 wherein said series of sections has a final section, wherein said length of constant arc radius of said final section ends with a point.

15. The transparent member in claim 12 wherein said series of sections has in the range of approximately 3 to 300 of said sections.

16. The transparent member of claim 12 wherein said rounded side is coated with a reflective material.

17. An elongated LED light emitting diode light spreader comprised of a light-transmissible material having a light conductive end, a light emitting flat surface, and an optical path conversion means; said optical path conversion means is a plurality of partial cylindrical lengths interposed with partial frustoconical lengths forming said flat surface.

18. The light emitting diode light spreader of claim 17 wherein said light conductive end is planar.

19. The light emitting diode light spreader of claim 17 wherein said light conductive end is curved inward.

20. The light emitting diode light spreader of claim 17 wherein said transparent substrate is plastic.

21. The light emitting diode light spreader of claim 17 wherein said optical path conversion means is coated with a reflective material.

* * * * *